(12) United States Patent
Grande

(10) Patent No.: US 8,870,534 B2
(45) Date of Patent: Oct. 28, 2014

(54) PROPELLER DEVICE, VEHICLE DRIVE UNIT AND ENERGY CONVERSION UNIT

(76) Inventor: Bernd Grande, Berlin (DE)

( * ) Notice: Subject to any disclaimer, the term of this patent is extended or adjusted under 35 U.S.C. 154(b) by 821 days.

(21) Appl. No.: 12/991,148

(22) PCT Filed: May 6, 2009

(86) PCT No.: PCT/DE2009/000605
§ 371 (c)(1),
(2), (4) Date: Feb. 3, 2011

(87) PCT Pub. No.: WO2009/135468
PCT Pub. Date: Nov. 12, 2009

(65) Prior Publication Data
US 2011/0150650 A1    Jun. 23, 2011

(30) Foreign Application Priority Data

May 6, 2008  (DE) .......................... 10 2008 022 384

(51) Int. Cl.
*F01D 7/00* (2006.01)
*B64C 11/00* (2006.01)
*B64C 39/00* (2006.01)

(52) U.S. Cl.
CPC ............. *B64C 39/005* (2013.01); *B64C 11/006* (2013.01)
USPC ........................................... 416/79; 416/108

(58) Field of Classification Search
USPC ........ 416/79, 80, 81, 82, 83, 55, 60, 108, 109
See application file for complete search history.

(56) References Cited

U.S. PATENT DOCUMENTS 1,639,908 A  *  8/1927  Strandgren .................... 416/109
4,210,299 A     7/1980  Chabonat

FOREIGN PATENT DOCUMENTS

| DE | 1025275 | 2/1958 |
|----|---------|--------|
| DE | 148616  | 6/1981 |
| DE | 292 186 | 10/1983 |
| DE | 300 703 | 10/1983 |
| DE | 3608 991 | 3/1986 |
| DE | 3701151 | 7/1988 |
| DE | 3815283 | 11/1989 |
| DE | 4217374 | 12/1993 |
| DE | 4320625 | 1/1995 |
| GB | 280849  | 2/1928 |
| GB | 577 958 | 6/1946 |
| GB | 577958  * | 6/1946 |

OTHER PUBLICATIONS

U. Queck and W. Schmidt: "Delphine of the air, Z. Flieger-Revue Jun. 1970"; 9 pages total.

(Continued)

*Primary Examiner* — Edward Look
*Assistant Examiner* — Michael Sehn
(74) *Attorney, Agent, or Firm* — Schmeiser, Olsen & Watts, LLP

(57) ABSTRACT

The invention concerns a propeller device with a flow profile body assigned to a propeller and a multiple eccentric arrangement functionally coupled to the flow profile body, which has two eccentric components coupled with one another and able to rotate in opposite directions, and which is configured so as to convert a common rotational movement of the eccentric components in opposite directions into an oscillating movement of the flow profile body along a movement path between two end positions, and vice versa. Furthermore the invention concerns a vehicle drive unit with a propeller device, and also an energy conversion unit with a propeller device.

15 Claims, 7 Drawing Sheets

(56) References Cited

OTHER PUBLICATIONS

W. Schmidt: "Der Wellpropeller ein neuer Antrieb fur Wasser-, Land- und Luftfahrzeuge"; 9 pages total.

Articulated Flapping Wings; How Ornithopters Fly—Articulated Flapping Wings; http://www.ornithopter.de/english/articulated.htm.

* cited by examiner

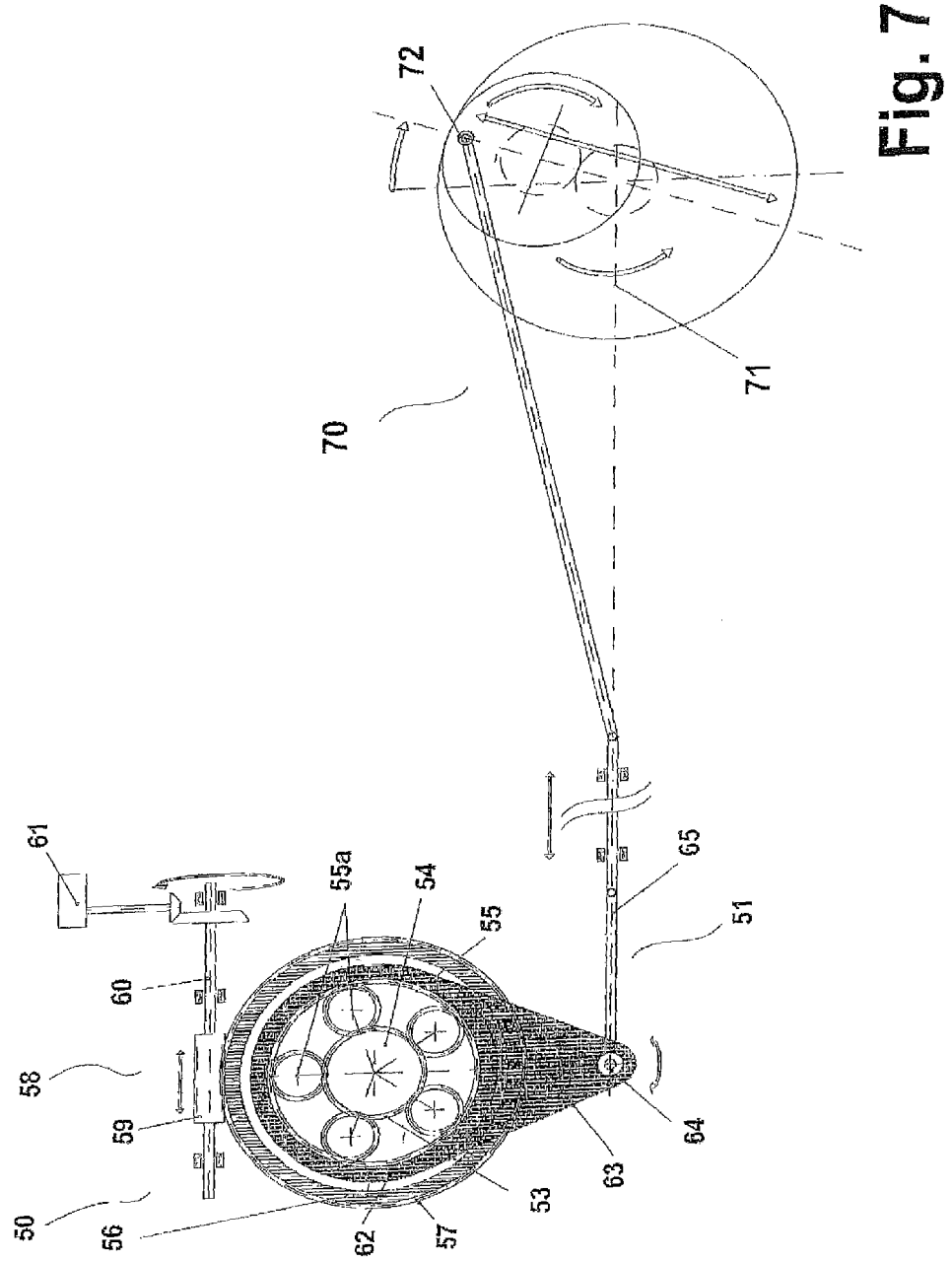

PROPELLER DEVICE, VEHICLE DRIVE UNIT AND ENERGY CONVERSION UNIT

The invention concerns a propeller device, also a vehicle drive unit and an energy conversion unit.

BACKGROUND TO THE INVENTION

A flow that generates propulsive force or thrust occurs, for example, behind the propeller of a ship or an aircraft, behind the exhaust nozzle of an aero gas turbine, and under the rotor of a helicopter. The thrust is here effected by means of the velocity increment of the accelerated flow relative to the travel velocity, or flight velocity. It is greater, the higher the velocity increment, and the larger the flow cross-section. Here the thrust generation is itself always the result of utilization of a lift component of lifting bodies rotating approximately at right-angles to the flow about a common central axis, for example, propeller blades, rotor blades, or turbine blades. A simultaneous lift generation for purposes of compensating for the vehicle weight is, insofar as it is necessary—in the case of a ship's hull in water or an airship it is not necessary in general—only possible via additional equipment with a lifting wing, or the deflection of the direction of thrust by means of appropriate additional components, for example, pivoting propellers, or pivoting nozzles.

The application of these systems for the generation and/or control of thrust and lift experiences limitations, however, in a number of respects. Thus by means of the rotating lifting bodies a swirl is also imparted to the flow in addition to the desired deflection; this makes its presence felt in an unfavourable manner when utilizing the flow for the generation of thrust and/or lift.

Thus systems generating thrust and lift have already been developed that have as their prototype the device generating what is in general the best known symbiosis of lift and propulsive force, a bird's wing, and are of known art under the term "ornithopter" Articulated flapping wings, Nov. 21, 2006; Other flapping wing designs, Nov. 21, 2006; Basic methods for the twisting of flapping wings, Nov. 21, 2006; The principle of flight of ornithopter, Nov. 21, 2006). However, ornithopters have been unable to find any industrial scale applications up to the present time.

Also systems have already been developed that avoid the swirl cited above. Here these primarily take the form of systems that utilize the Knoller-Betz effect, in which these initiate and influence the flow by means of a streamline-shaped and usually symmetrical deflecting body transversely mounted and moved in the flow. Here the displacements of these deflecting bodies take place by means of pivoting movements about their transversely mounted (inside or outside the deflecting body) axis of rotation (all-moving tailplane principle) (DE 38 15 283 A1), and/or by an upward and downward movement by means of a hydraulic ram (DBP 1 025 275) or cables (DE 37 01 151 A1, annex to P 36 08 991.5).

It has also already been proposed for purposes of increasing both the pivoting frequency and the amplitude to allow the transversely supported pivot axis of the deflecting body to rotate in an eccentrically linked manner. Here the transversely mounted pivot axis then moves, so to speak, on the surface of a virtual cylinder rotating at right angles to the flow, and the profile chord of the deflecting body is held approximately parallel to the flow by means of a gearing mechanism. The best-known example of this type of drive is the wave propeller (W. Schmidt: The wave propeller, a new drive for water, land and air vehicles, Z. Flugwiss. 13 (1965), volume 12, pages 472-479 and DD 148 616). Here no form of thrust vector control is provided, and no utilization of lift forces for weight compensation is possible. Use of this drive is therefore preferably thought of in conjunction with a flow-smoothing profile body mounted downstream for pure thrust generation, as for example in the "Delphine airship" (U. Queck and W. Schmidt: Delphine of the air, Z. Flieger-Revue Jun. 1970, pages 226-233).

Thus it has also already been proposed to allow these deflecting bodies or the plurality of rotating deflecting bodies, as in the case of the wave propeller, to rotate between two parallel opposing discs eccentrically linked from their central axis transverse to the flow, but in addition during rotation also to activate individual members electronically via appropriate actuators in a systematic manner so as to generate an impulse in the direction of the desired thrust vector at all angles of rotation of the rotor (DE 42 17 374 and DE 43 20 625 A1). Up to the present time there have been no practical implementations of this drive of known art. Only one mechanical solution as a special form of this type of thrust vector control is of known art as the Voith-Schneider propeller, limited to ships' drives.

Furthermore a modified wave propeller drive with a downstream profile body has been proposed, which is intended to pivot as a complete unit, so as to thereby enable vector control (DD 300 703 A7).

Furthermore a light aircraft with a manual drive of a flapping wing guided in a semicircular shape is of known art; this is intended to generate the lift in addition to the propulsive force (DD 292 186 A5).

What is disadvantageous in the drive units that have been so far presented is on the one hand their efficiency, which is usually too low as a result of too low a flapping frequency, their limitation to the generation of thrust, and an achievement of a good efficiency that is limited to particular ranges of rotational speed. Furthermore, the rotating systems have a reduced efficiency as a result of the ineffective phases during the circular movement of the deflecting body, or bodies, which become apparent in the segment of rotation in which they are retreating (similar to those phases occurring in the case of a helicopter rotor), as well as a cyclically-fluctuating separation distance from the vehicle body.

Moreover, the lift-generating surface area of the individual deflecting bodies (at least in the case of a multiple arrangement) in the wave rotor is far smaller, because both the profile chord is limited, and thus also the profile thickness, and so for reasons of strength the span also.

Also by virtue of the circle of rotation a relatively large lever arm for the linkage of these drives to the vehicle body/aircraft fuselage is disadvantageous in terms of weight, forces and moments.

SUMMARY OF THE INVENTION

The underlying invention is that of creating an improved propeller device, which avoids the above-cited disadvantages of propeller devices of known art, and enables a high frequency of a continuous change of a movement direction of a flow profile body with high performance implementation and variable controllability.

In accordance with the invention this is achieved by means of a propeller device in accordance with claim 1, also a vehicle drive unit in accordance with claim 14, and an energy conversion unit in accordance with claim 15.

The invention comprises the concepts of a propeller device with a flow profile body assigned to a propeller and a multiple eccentric arrangement functionally coupled to the flow profile body, which has two eccentric components coupled with one another and able to rotate in opposite directions, and which is configured so as to convert a common rotational movement of the eccentric components in opposite directions into an oscillating movement of the flow profile body along a movement path between two end positions, and vice versa.

The invention furthermore comprises the concepts of using the propeller device in a vehicle drive unit, or in an energy conversion unit. Advantageous embodiments of the invention are the subjects of dependent claims.

In accordance with the invention a flow profile body and a multiple eccentrics arrangement with two eccentric components are coupled with one another such that during the rotation of the eccentric components in opposite directions the flow profile body executes an oscillating movement between two end positions, and an oscillating movement of the flow profile body between the two end positions leads to a rotational movement of the eccentric components in opposite directions.

When using the propeller device in accordance with the invention to drive a vehicle the two eccentric components are proportionally rotated in opposite directions. The rotational movement can be carried out manually, or by means of a motor, or by means of a plurality of motors or engines acting together in a coordinated manner. Here the motor can take the form, for example, of an electric motor, or a petrol or gas engine. The motor is coupled to the eccentric components by means of coupling mechanisms of known art. Coupling mechanisms of known art are, for example, gears, toothed belts, or transmission systems, in particular chain transmissions, rolling element transmissions, belt drives, or any other devices for the transfer and/or conversion of rotational speeds or torques. By means of the propeller device in accordance with the invention the rotational movement of the eccentric components in opposite directions is converted into an oscillating movement, i.e. an oscillating stroke, of the flow profile body along a movement path between two end positions. The flow profile body, which preferably has a lifting surface profile, thus moves through a medium, for example, air, gas, water, or a fluid, as a result of which a lift and/or a forwards thrust is achieved, which drives the vehicle. The vehicle can take the form of an air, surface water, underwater or land vehicle.

In the use in accordance with the invention of the propeller device for the conversion of energy the propeller device is introduced into a flowing medium, for example, a gas, a gas mixture, a liquid, vapour or a fluid. The medium flowing against and/or around the flow profile body, which preferably has a lifting surface profile, preferably a symmetrical lifting surface profile, displaces the flow profile body from a position of rest. By virtue of the coupling in accordance with the invention of the flow profile body with the multiple eccentrics arrangement the flow profile body is thus forced into a movement path between two end positions. The resultant oscillating movement is then converted into a common rotational movement of the eccentric components in opposite directions. The rotational movements of the eccentric components in opposite directions can now, for example, drive a generator for purposes of power generation. In this manner kinetic energy of the flowing medium is converted into electrical energy. However, the two eccentric components can also, for example, be coupled to a pump, which is driven by means of the rotational movement of the eccentric components. The pump can then, for example, pump water from a first level to a second higher level. In this manner the kinetic energy of the flowing medium has been converted into potential energy of the water. The multiple eccentrics arrangement can preferably be coupled with a heat engine, a Sterling engine, or a machine that operates in accordance with the Carnot cycle process.

One embodiment of the invention envisages that the movement path is appropriately formed from a movement selected from the following group of movements: a linear movement and an elliptical movement. The eccentric components are preferably mounted with the same eccentricity. In particular the eccentric components are configured for the same rotational speed with rotation in opposite directions. Here the same rotational speed means the rotational speed relative to the coordinate system of the respective eccentric axis, if the alignment of these coordinate systems to one another is established as remaining the same. For example, if the eccentric components are mounted with the same eccentricity and configured for the same rotational speed, the movement path is then just formed accordingly as a linear movement. In contrast, if the eccentric components are mounted with different eccentricities the movement path is formed accordingly as an elliptical movement. The two eccentric components preferably comprise wheel-shaped centrifugal mass discs.

One further embodiment of the invention has an adjustment mechanism, which is configured to adjust the attitude of a longitudinal axis of a cross-sectional profile of the flow profile body relative to a straight connecting line between the two end positions. In this manner the attitude of the longitudinal axis can be varied within regulatory limits. The attitude can, for example, be an adjustment angle, or setting angle, formed by means of the longitudinal axis and the straight connecting line. By this means the flow profile body can be aligned relative to a medium flowing against and/or around the flow profile body.

In one embodiment of the adjustment mechanism the flow profile body is coupled with a cascade-type change speed transmission. A cascade-type change speed transmission comprises in one possible embodiment a plurality of individual elements, for example, a plurality of gears or belt drives coupled one behind another, wherein a rotation of one gear or belt drive initiates further rotations on the part of the other gears or belt drives. The cascade-type change speed transmission is then, for example, coupled with a stroke rod designed as a shaft or worm of a worm gear transmission. If the stroke rod is rotated about its central axis the individual elements of the cascade-type change speed transmission also rotate, and thus finally the flow profile body also. The flow profile body is preferably coupled to the cascade-type change speed transmission in the region of a transverse axis; for example, the transverse axis is arranged centrally aligned with a gear of the cascade-type change speed transmission. The transverse axis can, for example, be designed as a hollow axle. Preferably the transverse axis is arranged such that the transverse axis coincides with the centre of gravity of the flow profile body. In particular the transverse axis is arranged ahead of the neutral point of the cross-sectional profile of the flow profile body. The stroke rod is preferably coupled with a transmission gear, which, for example, is driven by a drive of a servomotor. For example, a coupling of the stroke rod with the transmission gear can, for example, take place in that in a sliding region on the stroke rod a profile (i.e. a profile body) is formed, such as an external triangular profile. The transmission gear is arranged essentially in the centre of the sliding region, and essentially in the centre of the central axis of the stroke rod, with a corresponding counter profile, for example, a triangular internal profile, as an axis bore. In this manner the stroke rod is able to execute a translatory movement, that is to say, in the direction of the central axis, through the axis bore of the transmission gear, and only in the event of a rotation of the transmission gear does the profile interact with the counter profile such that the stroke rod rotates. However, a rigid connection of the transmission gear with the shaft can also be provided, for example by means of attachment of known art, such as screws, rivets, nails, or adhesives.

In another embodiment the adjustment mechanism comprises a planetary gear transmission, i.e. a planetary transmission. Here an externally toothed gear wheel of the cascade-type change speed transmission forms a central gear wheel. Around the central gear wheel are arranged a plurality of planet gears designed as gear wheels, which interact with the sun gear. The design preferably features two planet gears, more preferably three planet gears, and even more preferably five planet gears. The axes of the planet gears are rigidly attached to a round body of a transmission gear, which can be rotated by means of drives of known art. The axes of the planet gears are here, for example, rigidly attached to a round body of a worm gear of a worm gear transmission, wherein the worm gear is arranged to be essentially aligned centrally with a central axis of the sun gear. If the worm gear is rotated, for example by means of a gear wheel with helical teeth, in particular by means of a worm, the central gear rotates in accordance with a transmission ratio of the planetary transmission, as a result of which the attitude of the flow profile body coupled with the cascade-type change speed transmission is adjusted. The worm gear can, in particular, be driven by means of a drive of a servomotor.

A further development of the invention envisages that the attitude of the longitudinal axis of the cross-sectional profile is designed to be stationary during the oscillating movement. The attitude is preferably designed to be stationary by arresting the drive gear of the cascade-type change speed transmission. The adjustment angle is, for example, approximately 90°.

In one further form of embodiment of the invention a pivoting mechanism is designed, which is configured so as to overlay the oscillating movement of the flow profile body between the end positions with a pivoting movement of the longitudinal axis of the cross-sectional profile of the flow profile body about a central attitude of the longitudinal axis. In one embodiment the pivoting mechanism comprises a stroke rod designed as a shaft, or a worm, of a worm gear transmission, which is coupled with a cascade-type change speed transmission, wherein the flow profile body is coupled with the cascade-type change speed transmission. If the stroke rod is moved backwards and forwards in a translatory manner in the direction of the central axis of the stroke rod, this translatory movement is then converted into a rotational movement of the individual elements of the cascade-type change speed transmission, as a result of which the flow profile body is subjected to a pivoting movement corresponding to the translatory movement of the stroke rod. In one form of embodiment the stroke rod is coupled to a swashplate drive, which in particular is driven by a main motor. The swashplate drive preferably comprises a coupling mechanism coupled to a swashplate, wherein the coupling mechanism is configured so as to introduce a repetitive translatory movement onto the stroke rod that is delivered, for example, by the main motor. One development of the invention preferably envisages that the coupling mechanism has a plunger coupled to the swashplate, which is guided in a linear guide.

In one embodiment of the invention provision can be made that the pivoting mechanism has an internally toothed gear, preferably a ring gear. In particular the internally toothed gear comprises an eccentrically overhanging cam lever. Provision can be made that an eye is formed on the cam lever. A further stroke rod is coupled with the internally toothed gear wheel; the further stroke rod is preferably arranged on the cam lever, in particular the further stroke rod is arranged on the eye of the cam lever in an articulated manner. A planetary transmission is formed in an internal region of the internally toothed gear wheel. In particular the planetary transmission takes the form of the planetary transmission already featured in an exemplary form of embodiment of the adjustment mechanism in accordance with the invention, and described above. By means of the interaction of the internal teeth of the internally toothed gear wheel with the planetary transmission, in particular with the planetary gears, a rotational movement of the internally toothed gear wheel is converted into a rotational movement of the sun gear of the planetary transmission, and via the cascade-type change speed transmission into a rotational movement of the flow profile body. In particular the further stroke rod is coupled with a swashplate drive, which, for example, is driven by the main motor.

In the above described forms of embodiment provision can be made to couple a damping system and/or a spring system, instead of the swashplate drive, with the stroke rod and/or the further stroke rod. A rotational movement of the flow profile body leads to a translatory movement in the direction of the central axis of the further stroke rod. The translatory movement is then damped by means of the damping system, and/or is acted upon with a restoring force formed by means of the spring system. The damped and/or with the restoring force acted upon translatory movement is then converted into a corresponding rotational movement of the flow profile body. The damping system preferably comprises dampers, for example shock absorbers, air spring dampers, hydraulic dampers or torsional shock absorbers. The spring system can preferably have springs, such as, for example, coil springs, elastomer springs, gas-pressurised springs, coil springs, torsional springs, leaf springs or annular springs. In particular the damping system and the spring system are designed with an adjustable damping characteristic and/or an adjustable spring characteristic. For example, a gas pressure of a gas of a gas-pressurised spring is adjustably designed such that the translatory movement can be more or less strongly damped.

Systematic control and/or influencing of the rotational movement of the flow profile body is thus made possible.

In one embodiment of the invention a combination of a pivoting mechanism in accordance with the invention with a damping system in accordance with the invention and/or a spring system in accordance with the invention can also be provided.

A further embodiment of the invention has a tilting mechanism, which is configured so as to adjust a spatial location of the straight connecting line between the end positions. This makes it possible to adjust a tilt of the oscillation plane formed by the straight connecting line and the transverse axis of the flow profile body. For example, the tilting mechanism is configured so as to adjust the respective rotational speeds of the two eccentric components separately from one another, or so as to be able to adjust the speeds in accordance with their deviation from one another. In order to tilt the spatial location of the straight connecting line the respective rotational speeds are adjusted to be different, as a result of which the spatial location of the straight connecting line executes a tilting movement. To stop the tilting movement the rotational speeds of the eccentric components are then adjusted to be the same once again. This tilting can take place, for example, by means of an oscillation plane pivoting transmission, or by variation of the rotational speeds of individual eccentric drive motors. For example, the tilting mechanism can be configured using independent multiple motor drives so as to adjust the rotational speeds of the respective drives of the eccentric components in accordance with their deviation from one another, and independently of one another, by means of direct continuously variable control of the rotational speeds of the motors, or by means of separate transmission stages that can be adjusted in a continuously variable manner independently of one another. The tilting mechanism is preferably configured so as to adjust, with linked or coupled central multiple motor drives, the rotational speeds of the respective drive axes, and thereby so as to adjust the eccentric components in accordance with their deviation from one another, and independently from one another by means of an oscillation plane pivoting transmission.

In another exemplary form of embodiment of the invention the multiple eccentrics arrangement has two further eccentric components coupled with one another and able to rotate in opposite directions, wherein the flow profile body is arranged between the two eccentric components and the two further eccentric components.

In another form of embodiment of the invention the flow profile body is designed as a lifting surface or a wing. In particular, the flow profile body has a surface coating that is designed to minimise the frictional resistance created by a flowing medium. For example the flow profile body can also have a surface profile, which is designed to minimise the frictional resistance. The flow profile body preferably comprises active and/or passive systems for purposes of influencing the flow around the body in the form of warping systems, and/or elements that can be retracted and extended, and can also be folded out, for example landing flaps, a further flow profile body, ailerons, spoilers, trimming tabs, or ancillary lift devices.

DESCRIPTION OF EXAMPLES OF EMBODIMENT OF THE INVENTION

In what follows the invention is elucidated in more detail with the aid of examples of embodiment with reference to the figures of a drawing. In the figures:

FIG. 6 shows a schematic representation of a form of embodiment of a further adjustment mechanism and two forms of embodiment of a further pivoting mechanism and FIG. 7 shows a schematic representation of a form of embodiment of a pivoting mechanism.

Figure 1:
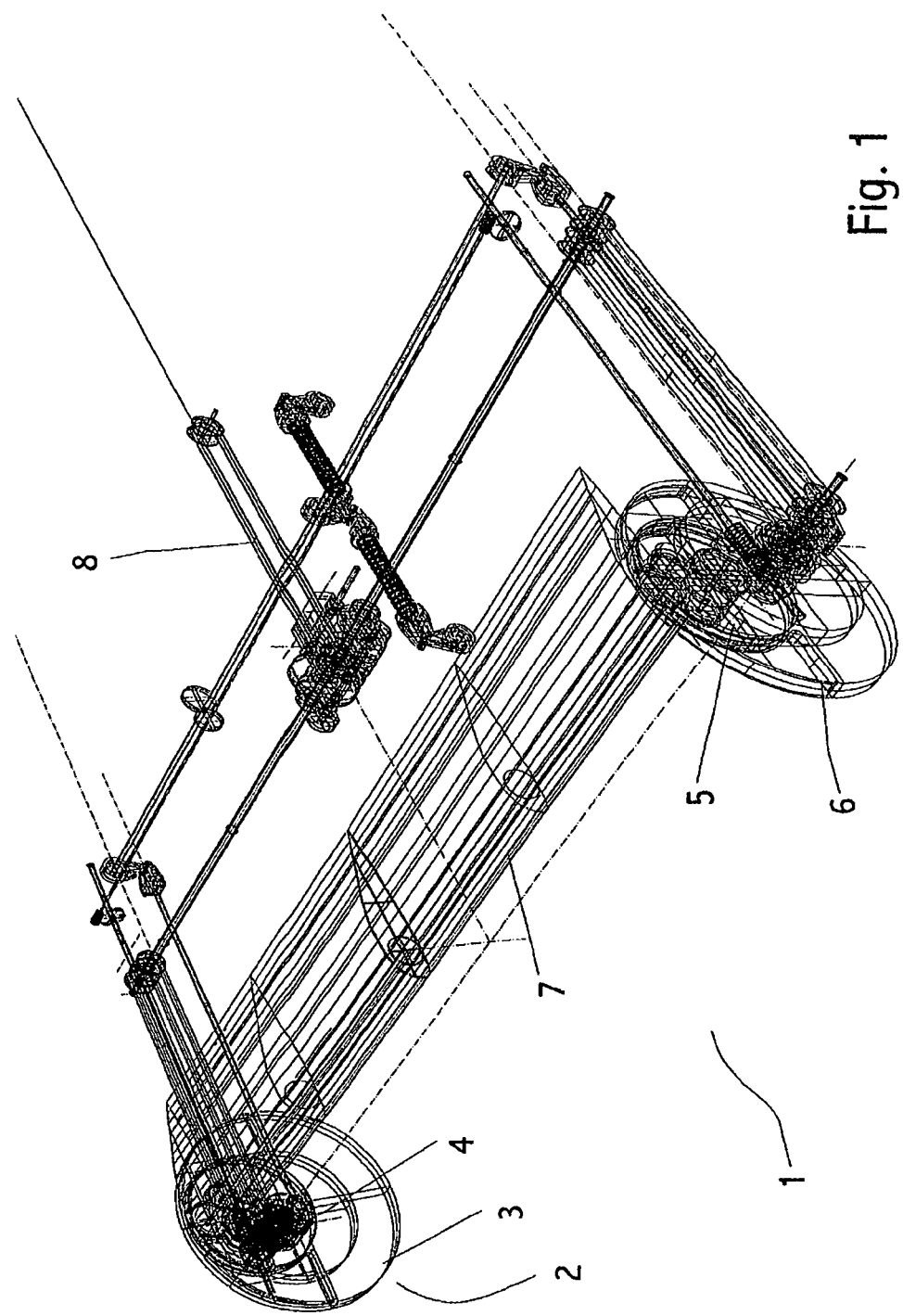
FIG. 1 shows a schematic representation of a form of embodiment of the invention.

FIG. 1 shows a propeller device 1 with a multiple eccentrics arrangement 2. The multiple eccentric arrangement 2 comprises two eccentric components 3 and 4 and two further eccentric components 5 and 6. A flow profile body 7 is arranged between the two eccentric components 3 and 4 and the two further eccentric components 5 and 6. Furthermore a belt drive 8 is coupled to the multiple eccentrics arrangement 2 to drive the two eccentric components 3 and 4 and the two further eccentric components 5 and 6.

Figure 2:
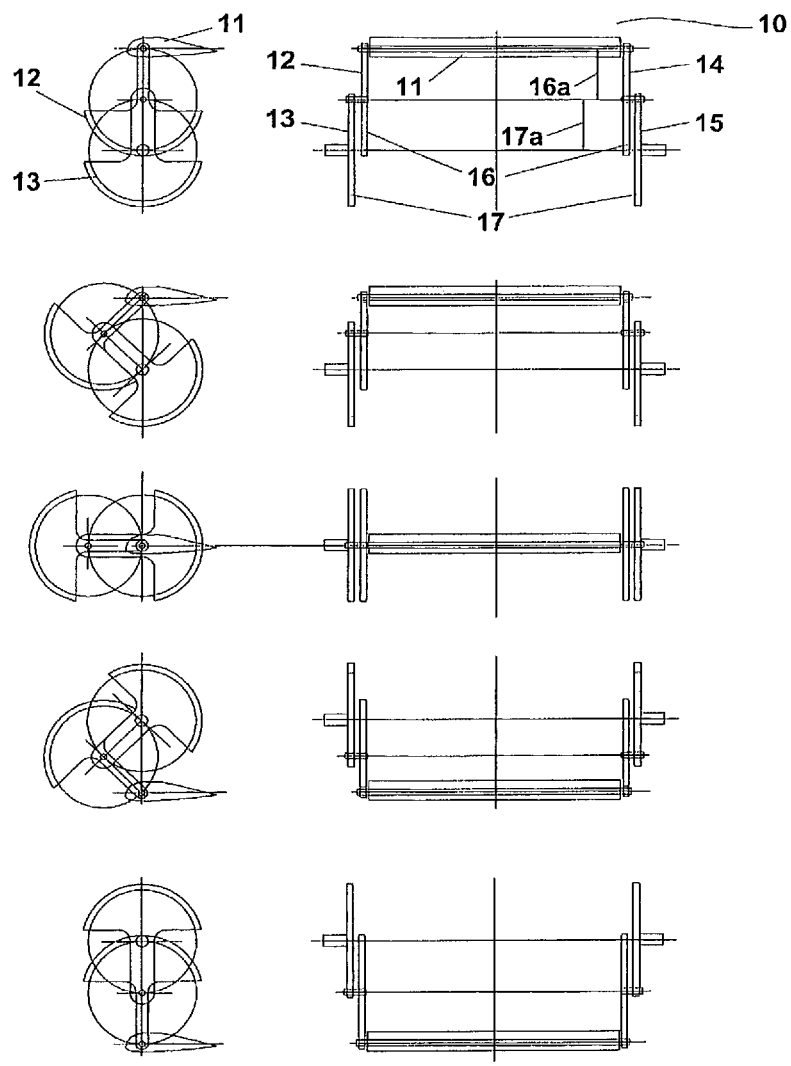
FIG. 2 shows a schematic representation of the functional principle of a form of embodiment of the invention.

FIG. 2 shows the functional principle of a multiple eccentrics arrangement in the context of the invention. Here a propeller device 10 is represented in various phases of an oscillating movement of a flow profile body 11 in a side view and in a front view. The propeller device 10 has two eccentric components 12 and 13 and two further eccentric components 14 and 15, wherein the flow profile body is arranged between the two eccentric components 12 and 13 and the two further eccentric components 14 and 15. The eccentric components 12 and 14 form an inner eccentric pair 16 with an inner eccentricity 16a, and the eccentric components 13 and 15 form and outer eccentric pair 17 with an outer eccentricity 17a. A transverse axis of the flow profile body 11 is arranged on an outer end of the inner eccentricity 16a of the inner eccentric pair 16 such that it can rotate, preferably such that the transverse axis coincides with the centre of gravity of the flow profile body 11 and lies ahead of the neutral point of the profile of the flow profile body 11. An axis of rotation of the eccentric components 12 and 14 forming the inner eccentric pair 16 is arranged on an outer end of the eccentric components 13 and 15 forming the outer eccentric pair 17 such that it can rotate. The outer and inner eccentricity, 16a and 17a, have the same length, or essentially approximately the same length, as a result of which a linear or an essentially approximately linear oscillating movement of the flow profile body 11 is ensured with the same rotational speeds and opposing directions of rotation of the eccentric components.

Figure 3:
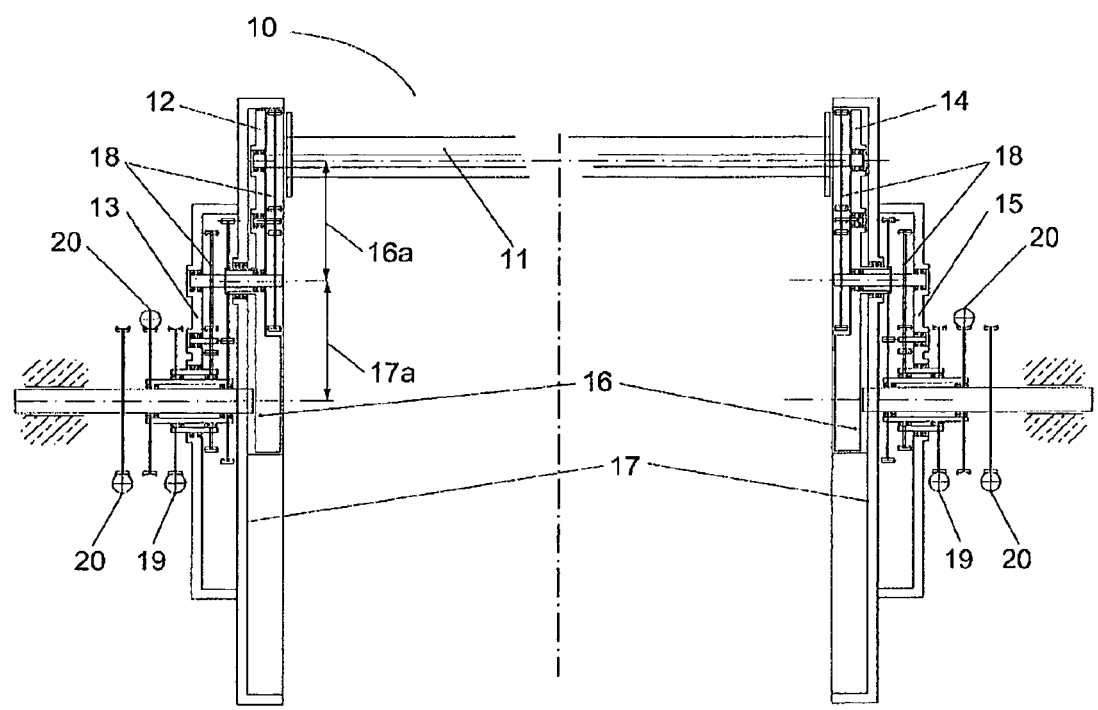
FIG. 3 shows a schematic representation of a cross-section of a development of the form of embodiment in FIG. 2.

FIG. 3 shows a cross-section of a development of the propeller device 10 shown in FIG. 2. In the development shown in FIG. 3 cascade-type change speed transmissions 18 are arranged on both sides of the propeller device 10; these are coupled with the transverse axis of the flow profile body 11. The cascade-type change speed transmissions 18 and the drive gears 19 are encompassed by an adjustment mechanism (not shown) and a pivoting mechanism (not shown). Furthermore the propeller device 10 comprises further drive gears 20; these are coupled with the two eccentric components 12 and 13, and the two further eccentric components 14 and 15, and the eccentric components 12 and 13 and two further eccentric components 14 and 15 in each case rotate in opposite directions. The further drive gears 20 are also driven by means of motors of known art (not shown).

Figure 4:
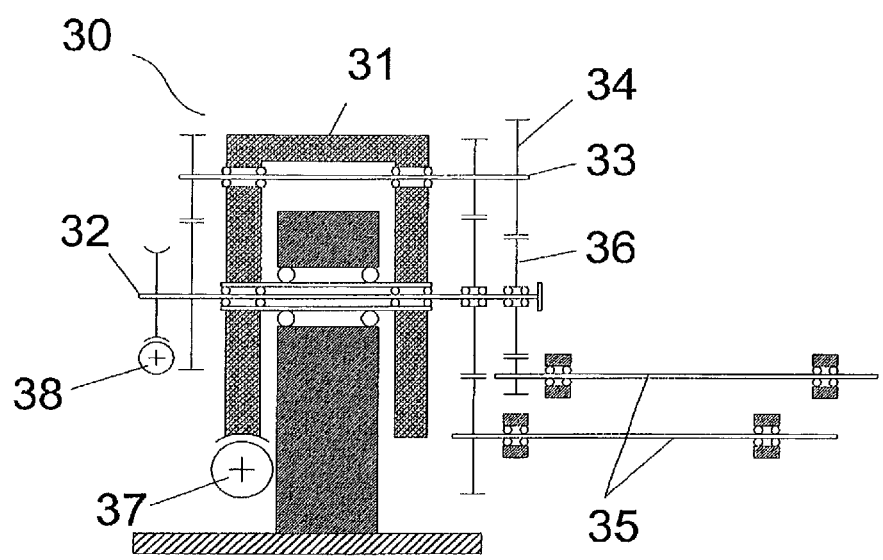
FIG. 4 shows a schematic representation of a cross-section of a tilting mechanism.

FIG. 4 shows a schematic representation of a cross-section of a tilting mechanism 30. The tilting mechanism 30 comprises a pivoting eccentric frame 31. The pivoting eccentric frame 31, has a transmission shaft 32, which is driven by a main motor 38, wherein the pivoting eccentric frame 31 is supported such that it can pivot in a continuously variable manner about the transmission shaft 32. For example the pivoting eccentric frame 31 can be pivoted in a continuously variable manner by means of a servomotor 37. The transmission shaft 32 is coupled with a shaft 33, for example by means of gear wheels. The drive force delivered by the motor is in this manner converted into a rotational movement of the shaft 33. The shaft 33 is coupled with stepped planet gears of a planetary transmission 34, so that the planet gears rotate with the rotational drive speed of the shaft 33. Transmission shafts 35 with drive gears 36 are coupled to the planetary transmission 34, wherein the drive gears 36 are arranged on the drive shaft 32 with their axes aligned, but not coupled, that is to say, they can rotate freely relative to one another. The drive gears 36 thus rotate with the rotational drive speed of the shaft 33, and in accordance with their step-up or step-down ratio as per the transmission design. If the pivoting eccentric frame 31 is pivoted, the drive gears 36 rotate with different rotational speeds by virtue of a rolling movement of the planet gears during the time duration of the rolling movement. The drive gears 36 are coupled with eccentric components (not shown) of a multiple eccentrics arrangement (not shown) by means of a transmission mechanism (not shown), for example, a toothed belt drive. In this manner the different rotational speeds of the drive gears 36 are transferred to the eccentric components, as a result of which the eccentric components rotate in opposite directions and with different rotational speeds, which results in a tilting of the spatial location of the straight connecting line between two end positions of an oscillating movement of a flow profile body (not shown).

Figure 5:
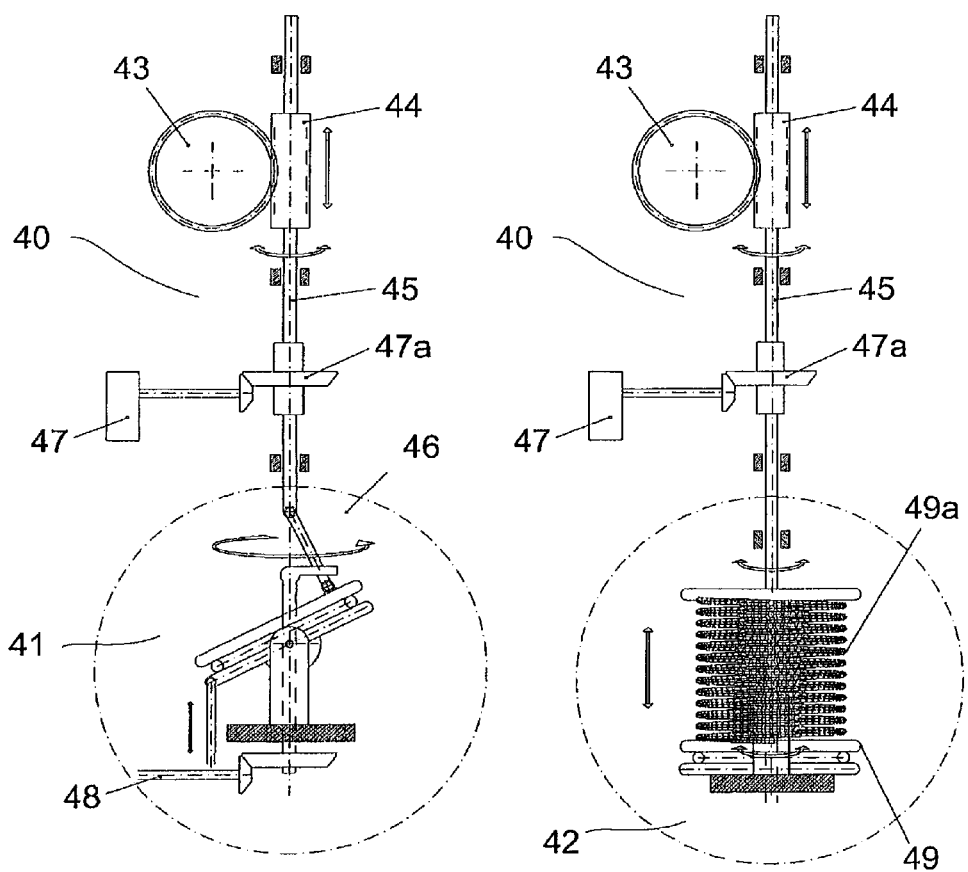
FIG. 5 shows a schematic representation of a form of embodiment of an adjustment mechanism and two forms of embodiment of a pivoting mechanism.

FIG. 5 shows in the left-hand diagram a schematic representation of an adjustment mechanism 40 and a pivoting mechanism 41. The right-hand diagram shows a schematic representation of the same adjustment mechanism 40 and another pivoting mechanism 42.

The adjustment mechanism 40 comprises a drive gear 43 of a cascade-type change speed transmission (not shown), to which a flow profile body (not shown) is coupled. The drive gear 43 interacts with a worm gear 44, wherein the worm gear 44 is arranged on a stroke rod 45. The stroke rod 45 has a profile, i.e. a profile body (not shown), in a sliding region. The profile body is, for example, designed as a triangular external profile. A transmission gear 47a is arranged in the centre of the sliding region, and central to the central axis of the stroke rod 45, with a counter profile, for example, a triangular internal profile, as an axis bore, through which the stroke rod 45 can slide backwards and forwards. If the transmission gear 47a is rotated, for example by means of a servomotor drive 47, then the profile interacts with the counter profile such that the rotational movement of the transmission gear 46 is converted into a rotational movement of the stroke rod 45. The rotational movement of the stroke rod 45 is then converted by means of the worm gear 44 into a rotational movement of the drive gear 43 of the cascade-type change speed transmission, as a result of which the attitude of a longitudinal axis of a cross-sectional profile of the flow profile body can be adjusted relative to a straight connecting line between the two end positions of the oscillating movement.

The pivoting mechanism 41 similarly comprises the drive gear 43 and the stroke rod 45.

Furthermore the pivoting mechanism 42 has a swashplate drive 46, which is driven from a main motor drive 48. The swashplate drive 46 is coupled with the stroke rod 45 and delivers a translatory movement, that is to say, a movement oscillating in the direction of the central axis of the stroke rod 45. This oscillating translatory movement is converted by means of the worm gear 44 into an oscillating rotational movement of the drive gear 43, as a result of which the oscillating movement of the flow profile body between the end positions is overlaid with a pivoting movement about a transverse axis.

If the stroke rod 45 is neither rotated nor displaced in the direction of the central axis, the flow profile body always remains in the same attitude during its oscillating movement.

The other pivoting mechanism 42 shown in the right-hand diagram in FIG. 5 comprises a spring system 49 with a spring 49a, which is coupled with the stroke rod 45. During its oscillating movement the flow profile body is subjected to flow forces by a medium, as a result of which the flow profile body is displaced from a position of rest, i.e. an equilibrium position. This displacement movement is converted by means of the worm gear 44 into a translatory movement of the stroke rod 45. The translatory movement extends and/or compresses the spring 49a, as a result of which a reactive spring force, i.e. a restoring force, is created. The spring system 49 thus forms a harmonic oscillator in the context of classical mechanics. The oscillation delivered from the harmonic oscillator is transferred by means of the worm gear 44 to the drive gear 43, and finally to the flow profile body.

Figure 6:
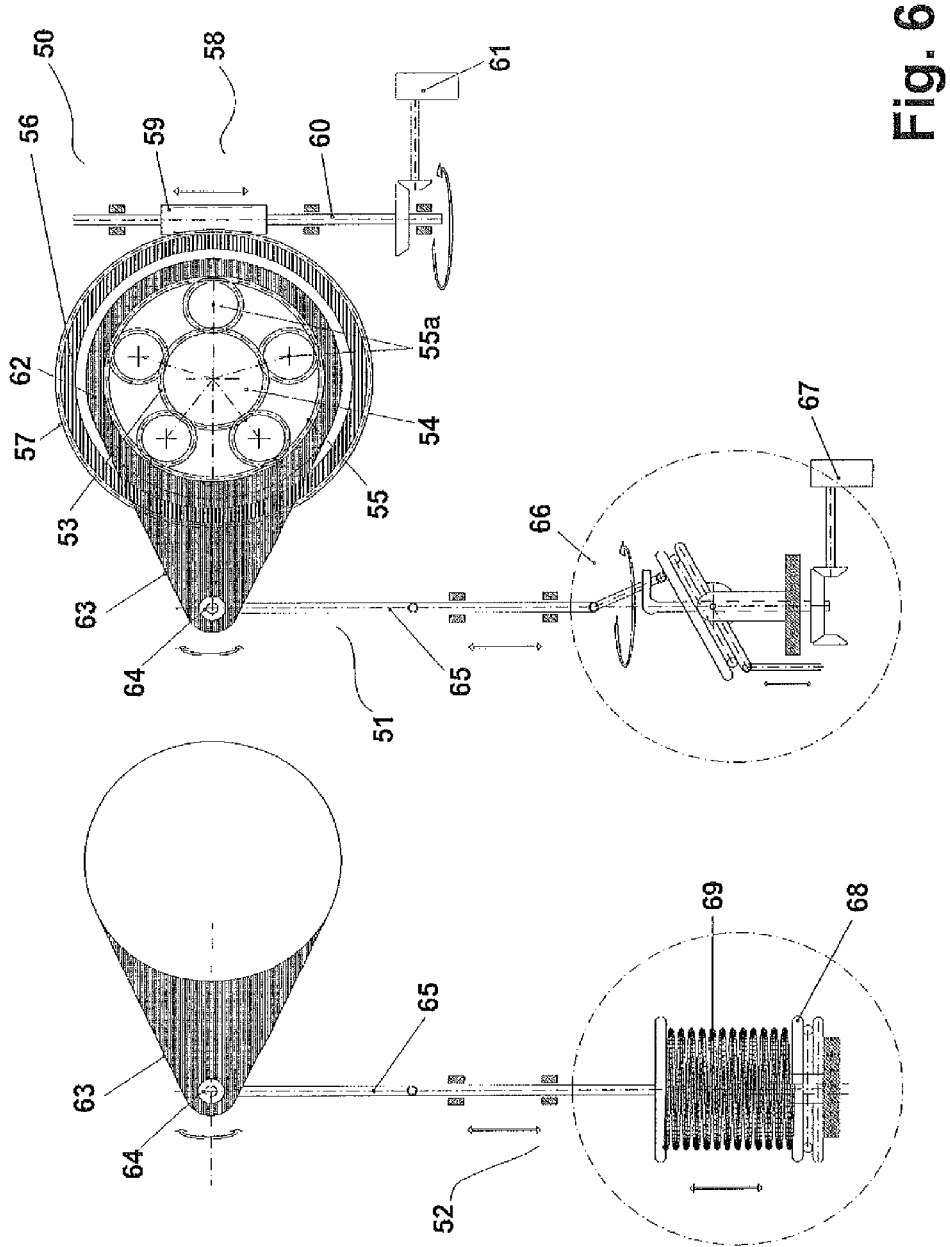

FIG. 6 shows in the right-hand diagram a further adjustment mechanism 50 and a further pivoting mechanism 51. The left-hand diagram in FIG. 6 shows an alternative pivoting mechanism 52.

The further adjustment mechanism 50 comprises a drive gear 53, of a cascade-type change speed transmission (not shown), wherein the drive gear 53 is designed as a central externally toothed spur gear 54 (sun gear) of a planetary gear transmission 55, which interacts with planet gears 55a arranged around the spur gear 54 (sun gear). A flow profile body (not shown) is coupled with the cascade-type change speed transmission. The respective axes of the planet gears 55a are rigidly attached to a base body 56 of a worm gear 57 of a worm gear transmission 58. The worm gear 57 is centrally arranged in alignment with the axis of the drive gear 53 such that it can rotate. The worm gear 57, is driven by a worm 59, which via a shaft 60 can be acted upon by the rotational movements of an actuator 61. The worm gear 57 is rotated by means of rotation of the shaft 60, and thus the drive wheel 53 of the cascade-type change speed transmission is rotated in accordance with the step-up ratio of the worm gear transmission 58 and the planetary transmission 55, and finally the attitude is adjusted of a longitudinal axis of a cross-sectional profile of the flow profile body.

The further pivoting mechanism 51 similarly comprises the planetary gear transmission 55. Furthermore, the further pivoting mechanism 51 has an internally toothed ring gear 62, with an eccentrically projecting cam lever 63, wherein the internal teeth interact with the planet gears 55. On the cam lever 63 is formed an eye 64, on which a further stroke rod 65 is arranged in an articulated manner. An oscillating translatory movement, that is to say an oscillating movement in the direction of the central axis of the further stroke rod 65, is converted by means of the planetary transmission 55 into an oscillating rotational movement of the drive gear 53 of the cascade-type change speed transmission, as a result of which an oscillating movement of the flow profile body between two end positions is overlaid with a pivoting movement about its transverse axis. In the case of the further pivoting mechanism 51 the oscillating translatory movement is delivered by means of a further swashplate drive 66, which is driven from a further main drive 67.

The alternative pivoting mechanism 52 shown in the left-hand diagram in FIG. 6 comprises in place of the further swashplate drive 66 a further spring system 68 with a spring 69, which is coupled with the further stroke rod 65, wherein the further spring system 68 acts in the same manner as the spring system 49 shown in FIG. 5.

FIG. 7 shows a schematic representation of a further form of embodiment of a pivoting mechanism. The same reference symbols are used in FIG. 7 for the same features as in FIGS. 5 and 6. The pivoting mechanism 70 shown in FIG. 7 comprises, in place of the further spring system 68 in the form of embodiment in FIG. 6, a double eccentric crank drive 71, which is coupled with the further stroke rod 65. The crank pin 72 moves in an oscillating manner on a preferably straight line path and with the same frequency as the oscillating stroke movement of the oscillation wing, but preferably with a phase displacement of about 90° in advance. For this purpose the double eccentric crank drive 71 is essentially structured in an analogous manner to the double eccentric wing drive, and can be acted upon with the same rotational speed. To ensure a continuously variable adjustment of the stroke of the stroke rod 65. the straight line path of the crank pin 72 can be pivoted in a continuously variable manner. The latter takes place by means of a further oscillation plane pivoting transmission analogous to that of the wing stroke drive.

The features of the invention disclosed in the previous description, the claims, and the drawing can be important, both individually and also in any combination with each other, for the implementation of the invention in its various forms of embodiment.

The invention claimed is:

1. A propeller device comprising:
a flow profile body assigned to a propeller and a multiple eccentric arrangement functionally coupled to the flow profile body, the flow profile body having two eccentric components jointly coupled with one another and able to rotate in opposite directions, and which is configured to convert a common rotational movement of the two eccentric components in opposite directions into an oscillating movement of the flow profile body along a movement path between two end positions, and vice versa;
wherein the movement path is appropriately formed from at least one of a linear movement and an elliptical movement.

2. The propeller device in accordance with claim 1, wherein the eccentric components are mounted with the same eccentricity leading to the linear movement of the movement path.

3. The propeller device of claim 1, wherein the elliptical movement of the movement path occurs if the two eccentric components are mounted with a different eccentricity.

4. The propeller device in accordance with claim 1, wherein an adjustment mechanism configured to adjust the attitude of a longitudinal axis of a cross-sectional profile of the flow profile body relative to a straight line connecting between the two end positions.

5. The propeller device in accordance with claim 4, wherein the flow profile body is coupled with a cascade-type change speed transmission.

6. The propeller device in accordance with claim 4, wherein an adjustment mechanism comprises a planetary transmission.

7. The propeller device in accordance with claim 1, wherein an attitude of a longitudinal axis of a cross-sectional profile of the flow profile body relative to a straight line connecting between the two end positions is designed to be stationary during the oscillating movement.

8. The propeller device in accordance with claim 1, wherein a pivoting mechanism is configured to overlay the oscillating movement of the flow profile body between the end positions with a pivotal movement of the longitudinal axis of the cross-sectional profile of the flow profile body about a central attitude of the longitudinal axis.

9. The propeller device in accordance with claim 8 wherein the pivotal mechanism has a damping system or a spring system.

10. The propeller device in accordance with claim 1, wherein a tilting mechanism is configured to adjust a spatial location of a straight line connecting between the end positions.

11. The propeller device in accordance with claim 10, wherein the tilting mechanism adjusts the respective rotational speeds of the eccentric components separately from one another.

12. The propeller device in accordance with claim 1, wherein the multiple eccentric arrangement has two further eccentric components, coupled with one another and able to rotate in opposite directions, wherein the flow profile body is arranged between the two eccentric components and the two further eccentric components.

13. The propeller device in accordance with claim 1, wherein the flow profile body is designed as a lifting surface or a wing.

14. A vehicle drive device with a propeller device in accordance with claim 1.

15. An energy conversion device with a propeller device in accordance with claim 1.

* * * * *

UNITED STATES PATENT AND TRADEMARK OFFICE
CERTIFICATE OF CORRECTION

| | | |
|---|---|---|
| PATENT NO. | : 8,870,534 B2 | Page 1 of 1 |
| APPLICATION NO. | : 12/991148 | |
| DATED | : October 28, 2014 | |
| INVENTOR(S) | : Bernd Grande | |

It is certified that error appears in the above-identified patent and that said Letters Patent is hereby corrected as shown below:

In the Specification

In Column 1, Line 38, insert -- ( -- before the word "Articulated".

In Column 4, Line 58, delete ", for example,".

In Column 7, Line 55-56, delete "eccentrics" and insert -- eccentric --.

Signed and Sealed this
Thirtieth Day of June, 2015

Michelle K. Lee
*Director of the United States Patent and Trademark Office*